(12) United States Patent
Jung et al.

(10) Patent No.: US 8,798,037 B2
(45) Date of Patent: Aug. 5, 2014

(54) APPARATUS AND METHOD FOR PROVIDING RECORDING SERVICE IN IP MULTIMEDIA SUBSYSTEM

(75) Inventors: Joon-Ho Jung, Seongnam-si (KR); Shi-Jae Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 723 days.

(21) Appl. No.: 12/617,372

(22) Filed: Nov. 12, 2009

(65) Prior Publication Data

US 2010/0118865 A1    May 13, 2010

(30) Foreign Application Priority Data

Nov. 11, 2008 (KR) ........................ 10-2008-0111614

(51) Int. Cl.
    *H04L 12/00*    (2006.01)
    *H04M 3/42*    (2006.01)
    *H04M 1/656*    (2006.01)
    *H04L 29/06*    (2006.01)

(52) U.S. Cl.
    CPC .......... *H04M 3/42221* (2013.01); *H04M 1/656* (2013.01); *H04L 65/00* (2013.01); *H04L 65/1063* (2013.01)
    USPC .......................................... 370/352; 709/227

(58) Field of Classification Search
    None
    See application file for complete search history.

(56) References Cited

U.S. PATENT DOCUMENTS

| | | | |
|---|---|---|---|
| 6,987,841 B1 | 1/2006 | Byers et al. | |
| 7,738,638 B1 * | 6/2010 | Henderson | 379/88.17 |
| 2006/0114885 A1 * | 6/2006 | Baek et al. | 370/352 |
| 2007/0118660 A1 * | 5/2007 | Garcia-Martin | 709/227 |
| 2008/0002719 A1 | 1/2008 | Byrd et al. | |
| 2008/0063167 A1 * | 3/2008 | Rao et al. | 379/142.13 |
| 2008/0253537 A1 * | 10/2008 | Johnston et al. | 379/88.08 |
| 2008/0310312 A1 * | 12/2008 | Acharya et al. | 370/241 |
| 2009/0103893 A1 * | 4/2009 | Sugino et al. | 386/83 |

FOREIGN PATENT DOCUMENTS

| | | |
|---|---|---|
| CN | 101079760 | 11/2007 |
| CN | 101099374 | 1/2008 |
| CN | 101282579 | 10/2008 |
| KR | 1020040001215 | 1/2004 |
| KR | 1020070099497 | 10/2007 |
| WO | WO 2008/030635 | 3/2008 |

\* cited by examiner

*Primary Examiner* — John Blanton
(74) *Attorney, Agent, or Firm* — The Farrell Law Firm, P.C.

(57) ABSTRACT

An apparatus and method are provided for proving the recording service in an Internet Protocol (IP) Multimedia Subsystem (IMS). The apparatus includes a communication unit for receiving a recording request from a calling portable terminal or a called portable terminal, and a recording service manager unit coupled to the communication unit for setting a path of bearer traffic for recording a conversation between the calling portable terminal and the called portable terminal.

26 Claims, 12 Drawing Sheets

FIG.12

# APPARATUS AND METHOD FOR PROVIDING RECORDING SERVICE IN IP MULTIMEDIA SUBSYSTEM

PRIORITY

This application claims priority under 35 U.S.C. §119(a) to a Korean patent application filed in the Korean Intellectual Property Office on Nov. 11, 2008 and assigned Serial No. 10-2008-0111614, the entire disclosure of which is incorporated herein by reference.

BACKGROUND OF THE INVENTION

1. Field of the Invention

The present invention relates generally to an apparatus and method for providing a recording service in mobile communication system, and more particularly, to a apparatus and method for proving the recording service in an Internet Protocol (IP) Multimedia Subsystem (IMS) based on Voice over IP (VoIP) communication.

2. Description of the Related Art

Recently, service providers and system manufacturers have begun to competitively develop products and services for providing different services over different platforms.

For example, many portable terminals are better classified as multimedia devices, which are capable of being used as phonebooks, hand held gaming devices, MPEG Layer 3 (MP3) players, and digital cameras. Additionally, these multimedia devices still provide telephone, short message, e-mail, and wireless Internet services.

Additionally, many of the portable terminals can record and store a voice call. For example, a portable terminal may record up to 60 minutes of a voice call in a 2G network and record up to 60 minutes of both a voice call and a video call in the 3G network.

However, this type of recording service is not provided in an IMS network based on VoIP.

Therefore, a need exists for an apparatus and method for providing a recording service in a communication based on VoIP.

SUMMARY OF THE INVENTION

The present invention addresses at least the above-mentioned problems and/or disadvantages and to provide at least the advantages described below. Accordingly, an aspect of the present invention is to provide an apparatus and method for providing a recording service in a communication system using Voice over Internet Protocol (VoIP).

Another aspect of the present invention is to provide an apparatus and method for requesting a recoding service in a calling portable terminal and a called portable terminal of the VoIP communication system.

Another aspect of the present invention provides an apparatus and method for providing a recording service rejection during VoIP communication.

In accordance with an aspect of the present invention, an apparatus for providing a recording service in IP Multimedia Subsystem network based on VoIP communication is provided. The apparatus includes a communication unit for receiving a recording request from at least one of a calling portable terminal and a called portable terminal, and a recording service manager unit coupled to the communication unit for setting a path of bearer traffic for recording a conversation between the calling portable terminal and the called portable terminal, when there is the recording request from at least one of the calling portable terminal and the called portable terminal.

In accordance with another aspect of the present invention, a method for providing a recording service in IP Multimedia Subsystem network based on VoIP communication is provided. The method includes receiving, by a recording server, a recording service request from at least one of a calling portable terminal and a called portable terminal, and setting, by the recording server, a path of bearer traffic for recording a conversation between the calling portable terminal and the called portable terminal, when there is a recording request from at least one of the calling portable terminal and the called portable terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

DETAILED DESCRIPTION OF EMBODIMENTS OF THE INVENTION

The following description with reference to the accompanying drawings is provided to assist in a comprehensive understanding of certain embodiments of the invention. The description includes various specific details to assist in that understanding; however, these are to be regarded as merely exemplary. Accordingly, those of ordinary skill in the art will recognize that various changes and modifications of the embodiments described herein can be made without departing from the scope and spirit of the present invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention.

It is to be understood that the singular forms "a," "an," and "the" include plural referents unless the context clearly dictates otherwise. Thus, for example, reference to "a component surface" includes reference to one or more of such surfaces.

Figure 1:
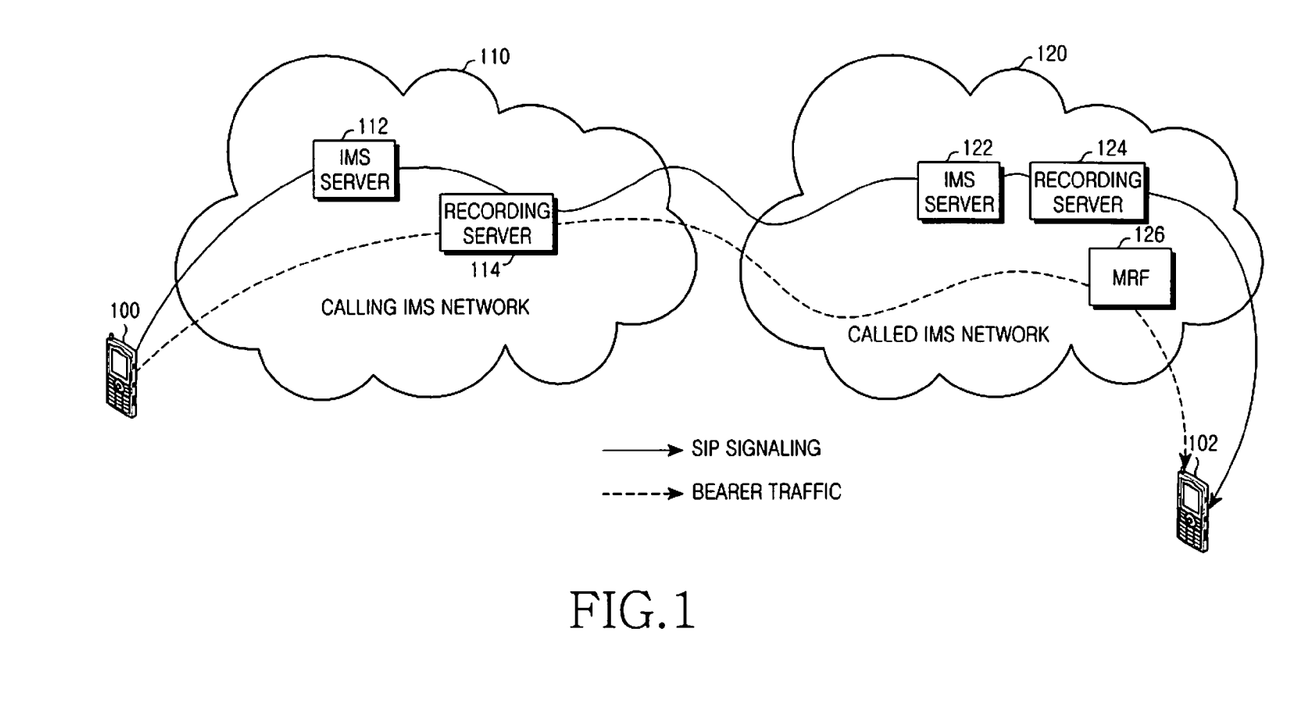
FIG. 1 illustrates a recording service in a mobile communication system according to an embodiment of the present invention.

FIG. 1 illustrates a recording service in a mobile communication system according to an embodiment of the present invention.

Referring to FIG. 1, the mobile communication system includes an IMS server 112 and a recording server 114 of a calling IMS network 110 and an IMS server 122 and a recording server 124 of a called IMS network 120. Further, the mobile communication system includes a Media Resource Functional (MRF) module 126 according to service.

When a calling portable terminal 100 or a called portable terminal 102 request a recording service, a bearer traffic path is established from the calling portable terminal 100 to the recording server 114, from the recording server 114 to the MRF 126, and from the MRF 126 to the called portable terminal 102.

The recording server 114 of the calling IMS network 110 controls the recording service and records a conversation. The recording server 124 of the called IMS network 120 also controls the recording service and stores a recorded conversation to the MRF module 126.

Portable terminals 100 and 102 are mobile devices that supported by the IMS networks 110 and 120. The portable terminals 100 and 102 start and stop the recording service. More specifically, each of the calling portable terminal 100 and a called portable terminal 102 may request the recording service when connecting to each other or after a connection is complete.

The portable terminals 100 and 102 determine that the counter-part is requesting the recording service, based on information provided from IMS network 110 and 120, respectively. Additionally, when the calling portable terminal 100 or the called portable terminal 102 requests the recording service, the other portable terminal may reject the recording service.

IMS servers 112 and 122 support the recording service, perform subscriber authentication, and provide a call control. Additionally, the IMS servers 112 and 122 connect the subscribers (e.g., portable terminals 100 and 102) and the recording servers 114 and 124 to each other.

When a subscriber completes a registration process, the respective IMS server receives a user profile from a Home Subscriber Server (HSS) (not shown) and stores an Initial Filter Criteria (iFC), which is included in user profile.

When a call is initiated by a registered subscriber, the IMS server enables Session Initiation Protocol (SIP) signaling to go through the recording server, using the stored the iFC. Here, the HSS is authorized to store and manage user information, which includes service related information, and send the user information to an IMS servers. For example, referring to FIG. 1, the user information is sent from the IMS server 112 to the portable terminal 100 through the recording server 114 using SIP signaling of the service subscriber.

The recording server 124 performs the voice call recording service itself or using the MRF 126, when the subscriber 102 requests the voice call recording service. More specifically, the recording server 122 modifies SIP messages and sets the route of bearer traffic's path to the recording server 122 itself.

However, when the MRF 126 supports the recording service, the may perform the recording service. That is, the recording server 122 notifies the recording service, which is now turned on, to the service subscriber 100 and the subscriber 100 may select whether or not to allow the subscriber 102 to record the conversation. When the SIP signaling, which includes recording request information, is received, the subscriber 100 is able to reject the recording service. The MRF 126 may record the voice call using its linkage with the recording server 122.

Figure 2:
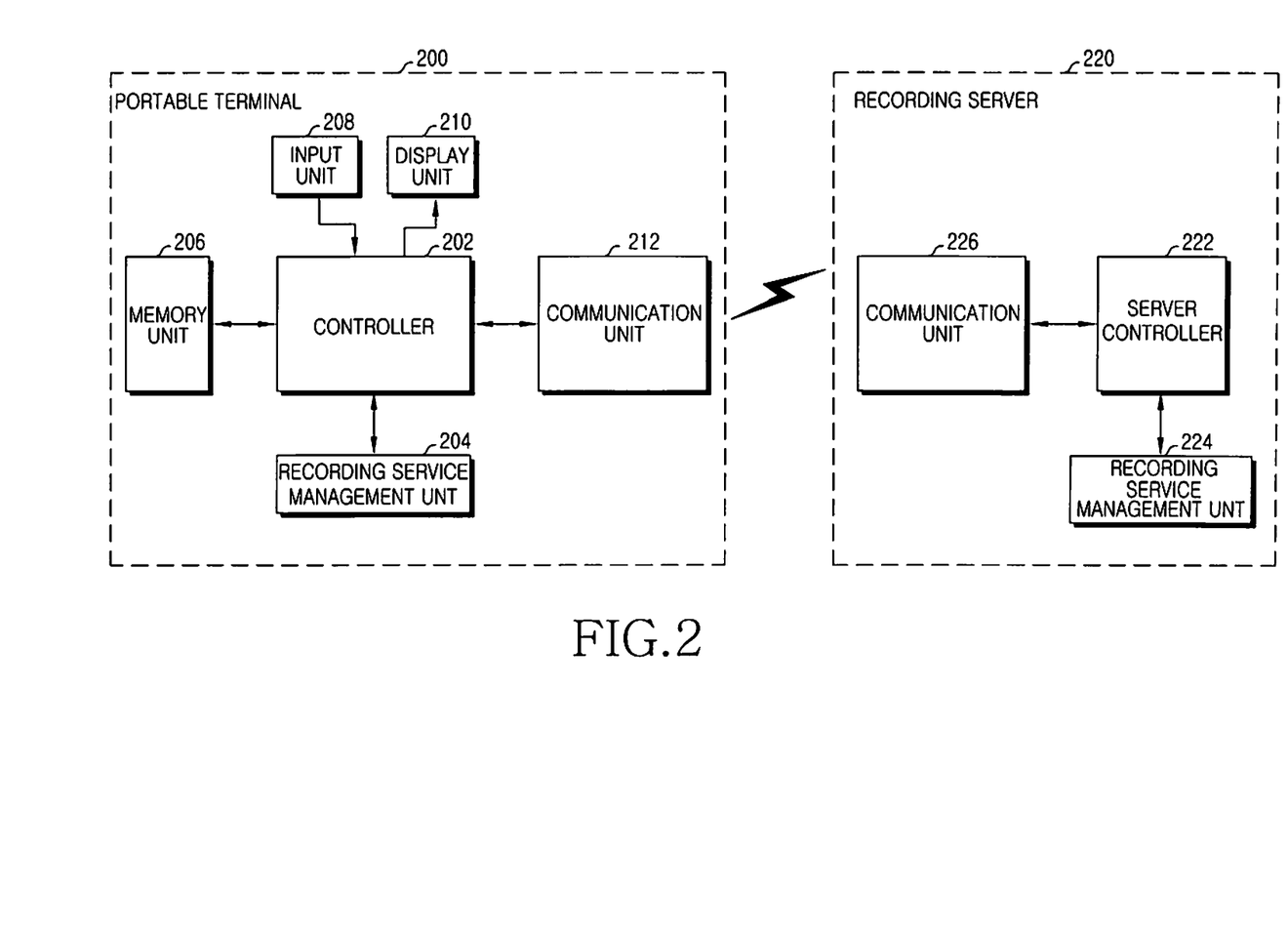
FIG. 2 is a block diagram of a mobile communication system according to an embodiment of the present invention.

FIG. 2 is a block diagram of a mobile communication system according to an embodiment of the present invention.

Referring to FIG. 2, the mobile communication system includes a portable terminal 200 and a recording server 220. The portable terminal 200 includes a controller 202, a recording service management unit 204, a memory unit 206, an input unit 208, a display unit 210, and a communication unit 226.

The controller 202 provides overall control of the portable terminal 200. Specifically, the controller 202 controls voice calls and data communications. In addition to typical functions, the controller 202 controls SIP signaling for a recording service, when the portable terminal 200 is connected to or trying to connect with a counter-part. Additionally, the controller 202 transmits information indicating the availability of the recording service, to the recording server 220 and registers a status of the recording service.

The recording service management unit 204 controls SIP signaling for the recording service with the recording server 220 under instruction of the controller 202 and setting a path of bearer traffic for recording a conversation between the calling portable terminal and the called portable terminal, in response to a recording request. The recording server 220 may be implemented by the controller 202.

The memory 206 includes, for example, a Read Only Memory (ROM), a Random Access Memory (RAM), and a flash ROM. The ROM stores a microcode of a program for controlling the controller 202 and the recording service management unit 204 as well as various reference data. The RAM is a working memory of the controller 202, and stores data temporarily generated when programs are running. The flash ROM stores various other types data, which needs to be preserved and may be updated, such as phone book data, outgoing message data, and incoming message data.

The input unit 208 includes, for example, numeric key buttons (0 to 9), a menu button, an erase button, a confirm button, a talk button, an end button, an Internet access button, a navigation key (or direction key) button, a plurality of function keys, character input keys, etc. The input unit 208 provides the controller 202 with key input data (e.g., a recording service request) corresponding to a key entry of a user.

The display unit 210 displays a status of the portable terminal 200 using numeric characters, moving pictures, still pictures, etc. For example, the display unit 210 is a color Liquid Crystal Display (LCD).

The communication unit 212 transmits and receives Radio Frequency (RF) signals including data that is input and output through an antenna (not shown). For example, in a transmitting process, data to be transmitted is subject to a channelcoding process and a spreading process, and is then transformed to an RF signal. In a receiving process, the RF signal is received and transformed to a base-band signal, and the base-band signal is subject to a de-spreading process and a channel-decoding process, thereby restoring the data. In accordance with an embodiment of the present invention, in addition to its typical functions, the communication unit 212 transmits and receives messages for a recording service.

The recording server 220 includes a server controller 222, a recording service management unit 224, and a communication unit 226. The server controller 222 provides overall control of the recording server 220. Specifically, the server controller 222 controls voice calls and data communications. Additionally, the server controller 222 registers a status of the recording service.

The recording server 220 sets a portable terminal address as a recording server address by transmitting an address to the portable terminals.

When a received message indicates that the portable terminal 200 does not want to utilize the recording service, the recording server 220 prevents the recording service.

The recording service management unit 224 offers the recording service using the registered status of the recording service, and controls SIP signaling for the recording service with the portable terminal 200.

The communication unit 226 transmits and receives messages for the recording service through the communication unit 212 of portable terminal 200.

Figure 3:
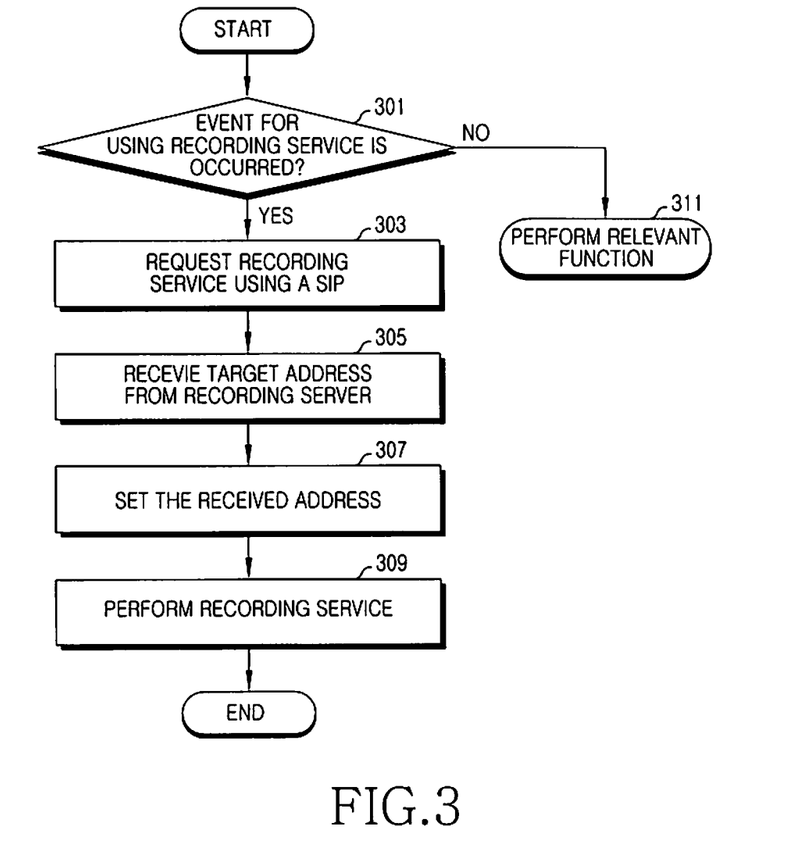
FIG. 3 is a flowchart illustrating a recording service method in a portable terminal according to an embodiment of the present invention.

FIG. 3 is a flowchart illustrating a recording service method in a portable terminal according to an embodiment of the present invention.

Referring to FIG. 3, in step 301, the portable terminal determines whether an event for using a recording service occurs. As indicated above, the event may occur during a call or when trying to connect a call.

If an event does not occur, the portable terminal performs another function, e.g., enters an idle mode, in step 311.

If an event occurs, the portable terminal requests the recording service from a recording server using SIP signaling in step 303. Here, the portable terminal may request the recording service using an "INFO" message included SIP. The "INFO" message is transmitted to the recording server through an IMS server. As described above, a recording request may come from a calling portable terminal or a called portable terminal.

In step 305, the portable terminal receives a target address from the recording server. The target address is a recording server's address for recording of the voice call history (conversation). The recording server may transmit the target address to a calling portable terminal and a called portable terminal.

In step 307, the portable terminal sets the received target address as the address of the recording server, and performs the recording service based on the received target address in step 309.

Figure 4:
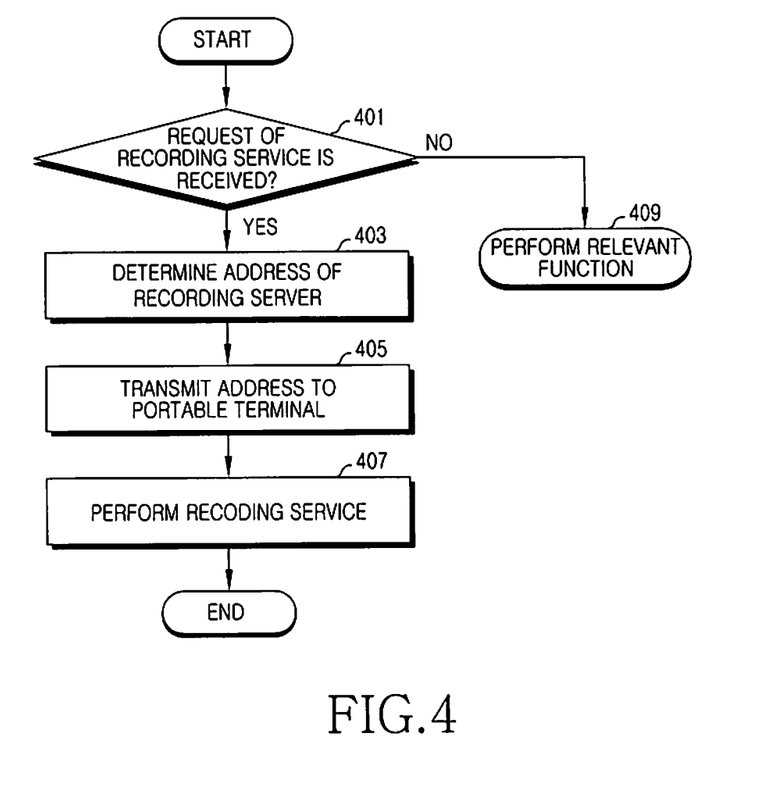
FIG. 4 is a flowchart illustrating a recording service method in a recording server according to an embodiment of the present invention.

FIG. 4 is a flowchart illustrating a recording service method in a recording server according to an embodiment of the present invention.

Referring to FIG. 4, in step 401, the recording server determines whether it receives a request for a recording service from a portable terminal.

If the recording server does not receive a recording service request in step 401, the recording server performs a corresponding function, e.g., enters an idle mode, in step 409.

If the recording server does receive a recording service request in step 401, the recording server determines an address of the recording server to be used by the calling portable terminal and the called portable terminal in step 403.

In step 405, the recording server transmits the determined address to the calling portable terminal and the called portable terminal.

When the recording server includes an additional element, i.e., a Media Resource Functional (MRF) module, the address of the MRF may be used as a receiving address.

In step 407, the recording server performs the recording service by setting the path of the calling portable terminal and the called portable terminal to the recording server.

Figure 5:
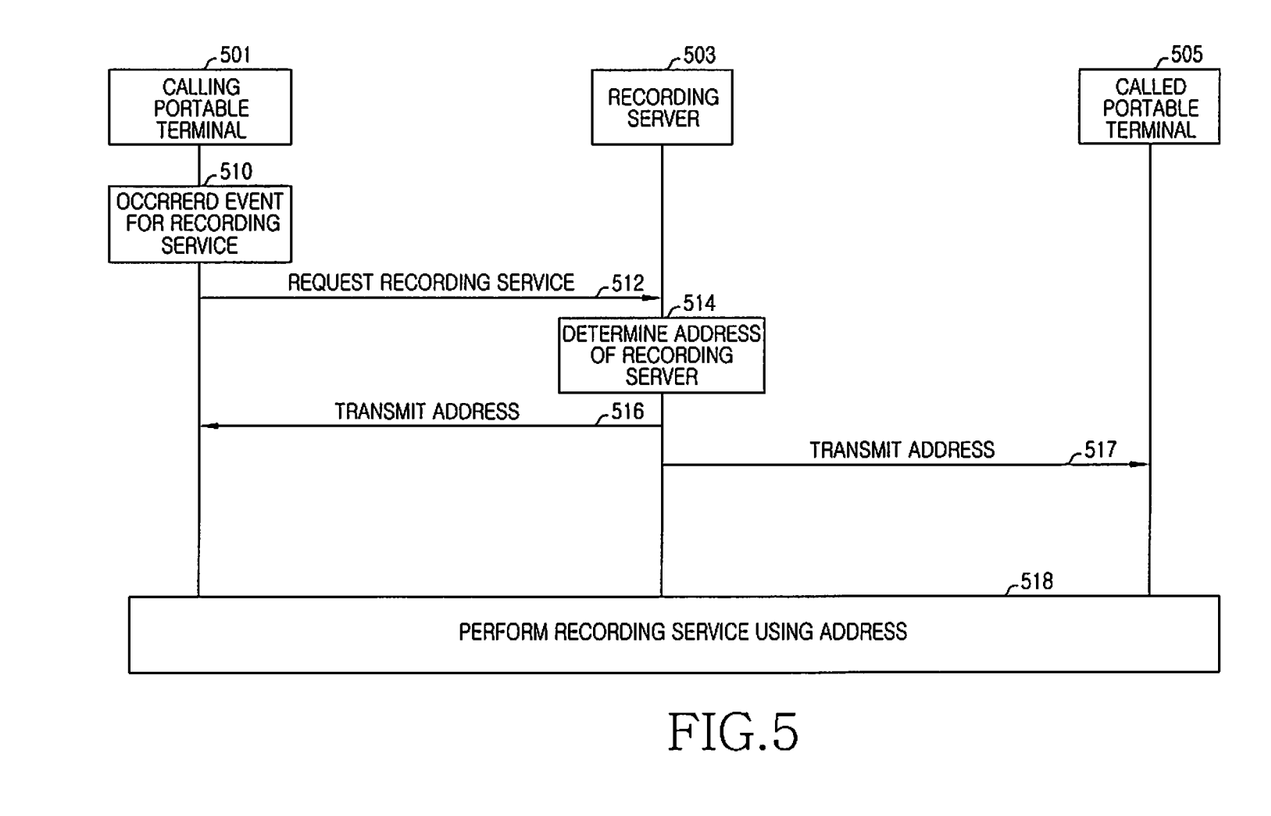
FIG. 5 is a ladder diagram illustrating a recording service method in a mobile communication system according to an embodiment of the present invention.

FIG. 5 is a ladder diagram illustrating a recording service method in a mobile communication system according to an embodiment of the present invention. More specifically, FIG. 5 illustrates a recording service between a calling portable terminal 501 and a called portable terminal 505 being requested at a call connection.

Referring to FIG. 5, an event for the recording service occurs in step 510. The calling portable terminal 501 transmits the recording service request to the recording server 503, in step 512.

As indicated above, in FIG. 5, the recording service request is transmitted at the call connection. For example, the request from the calling terminal is performed by inputting a feature code and a called portable terminal number, and then pressing a send key.

If the recording service request is received, the recording server 503 determines an address of a recording server 503 as a target address, in step 514 and transmits the determined address to the calling portable terminal 501, in step 516, and to the called portable terminal 505, in step 517.

Again, when the recording server 503 includes an additional element, i.e., a Media Resource Functional (MRF) module, the address of the MRF module may be used as the target address.

In step 518, the calling portable terminal 501 and called portable terminal 505 performs the recording service based on the received the target address, in step 518. More specifically, the calling portable terminal 501 and the called portable terminal 505 set the received the target address as the address of the recording server 503. Accordingly, a bearer traffic path between the calling portable terminal 501 and the called portable terminal 505 is set via the recording server 503. Thereafter, the recording server 503 performs the voice recording between the calling portable terminal 501 and the called portable terminal 505.

Figure 6:
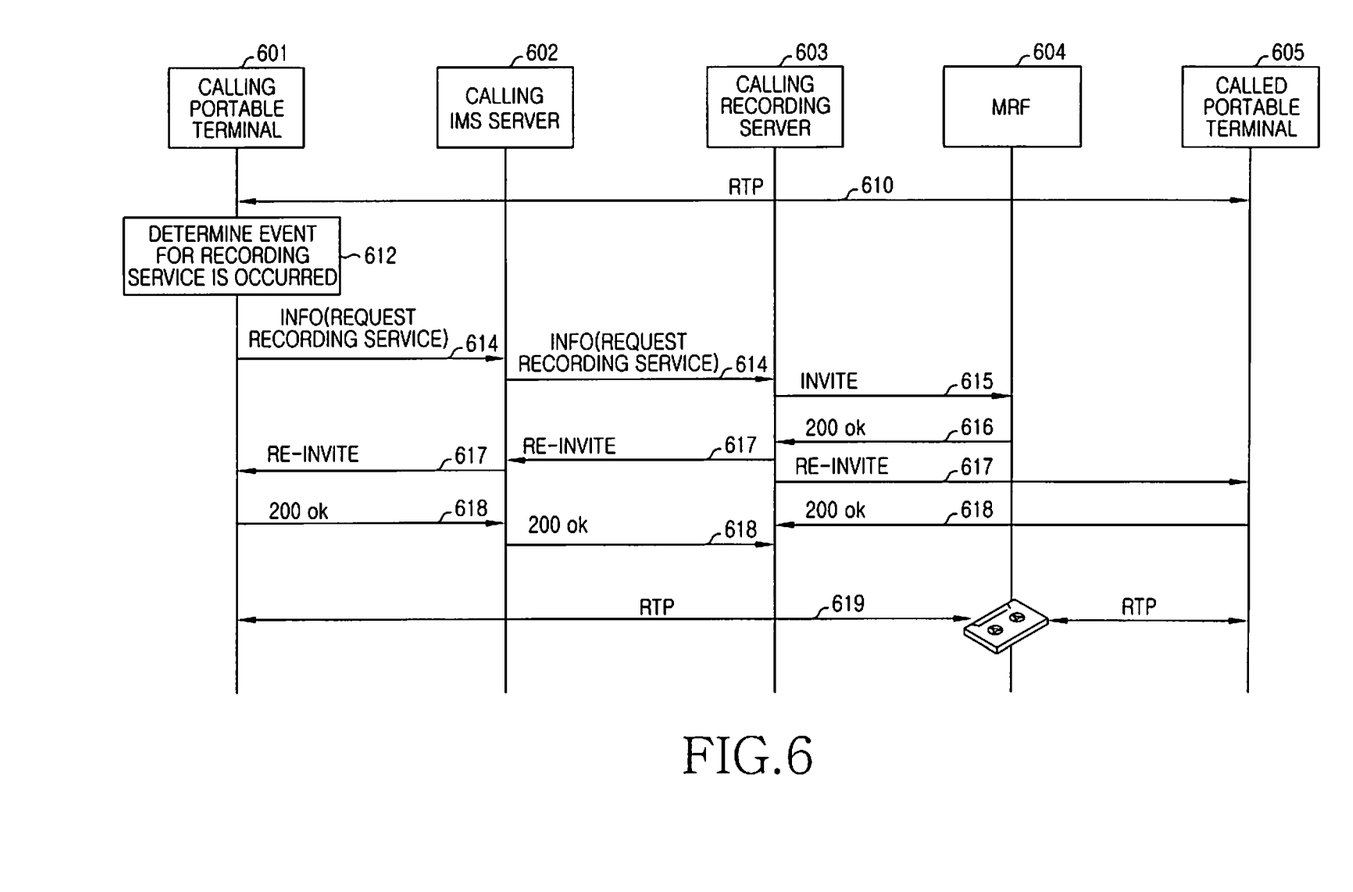
FIG. 6 is a ladder diagram illustrating a recording service method in a calling portable terminal according to an embodiment of the present invention.

FIG. 6 is a ladder diagram illustrating a recording service method in a calling portable terminal according to an embodiment of the present invention. More specifically, FIG. 6 illustrates a calling portable terminal 601 requesting a recording service during an established call, in step 610.

In step 612, the calling portable terminal 601 requests the recording service to a calling recording server 603 using an "INFO" message, which included in SIP signaling. The request is transmitted to the recording server 603 through a calling IMS server 602, in step 614.

The calling recording server 603 transmits the received request to a Media Resource Functional (MRF) module 604 using an "INVITE" message included in SIP in step 615, and in step 616, the MRF module 604 transmits a response message "200 OK" including an address of the MRF module 604 to the calling recording server 603.

The address transmitted by MRF module 604 is a recording server's address as a target address for recording of a voice call history.

In step 617, the calling recording server 603 transmits the received address of MRF module 604 to the calling portable terminal 601 and the called portable terminal 605 in a RE-INVITE message, and receives a response message "200 OK" from the portable terminals 601 and 605 in step 618.

The portable terminals 601 and 605 set the target address as the received address of the MRF module 604. Accordingly, a bearer traffic path between the calling portable terminal 601 and the called portable terminal 605 is set via the MRF module 604.

In step 619, the MRF module 604 records the conversation between the calling portable terminal 601 and the called portable terminal 605.

Figure 7:
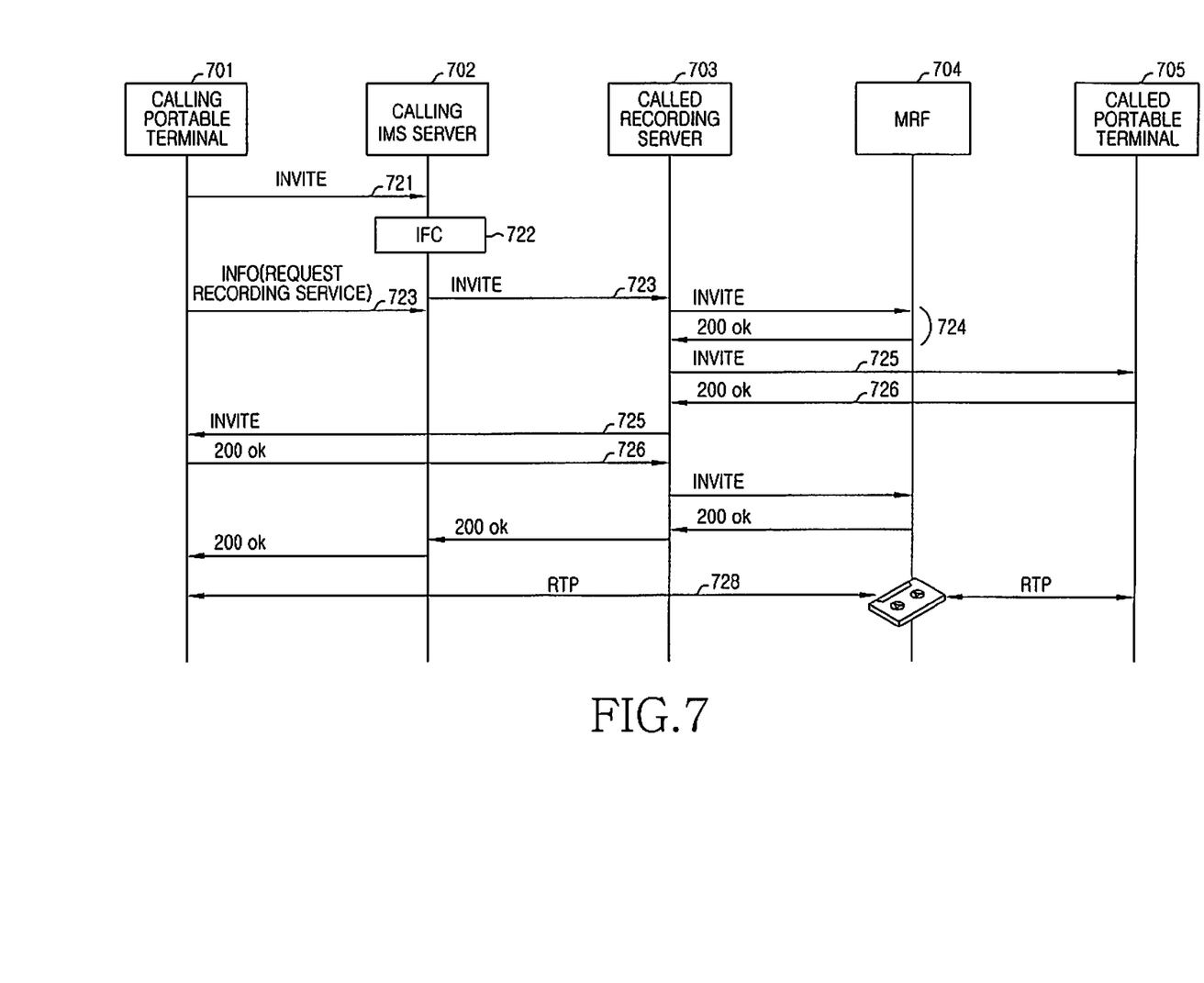
FIG. 7 is a ladder diagram illustrating a recording service method in a calling portable terminal according to an embodiment of the present invention.

FIG. 7 is a ladder diagram illustrating a recording service method in a calling portable terminal according to an embodiment of the present invention. More specifically, FIG. 7 illustrates a recording service between a calling portable terminal 701 and a called portable terminal 705 when a call connection is being initiated.

Referring to FIG. 7, in step 721, a calling portable terminal 701 initiates a recording service using an "INVITE" message. In step 722, a calling IMS server 702 sets an Initial Filter Criteria (iFC) related the recording service, and in step 723, connects a received call through a called recording server 703.

The called recording server 703 sets a bearer traffic path is via the called recording server 703 itself or a Media Resource Functional (MRF) module 704, by modifying an Session Description Protocol (SDP) of an "INVITE" message included in SIP signaling. More specifically, in step 724, the called recording server 703 transmits an address of the MRF module 704, which modifies the "SDP" of the "INVITE" message, to the calling portable terminal 701 and the called portable terminal 705, in step 725. The called recording server 703 receives a response message "200 OK" corresponding to the address of the MRF module 704, in step 726, and transmits the received response message to the MRF using "INVITE" message and receives a response message "200 OK". The called recording server transmits the received response message to the calling portable terminal using "200 OK" message. Accordingly, a bearer traffic path between the calling portable terminal 701 and the called portable terminal 705 is set via the MRF module 704, in step 728.

Thereafter, in step the MRF module 704 records the conversation between the calling portable terminal 701 and the called portable terminal 705.

Figure 8:
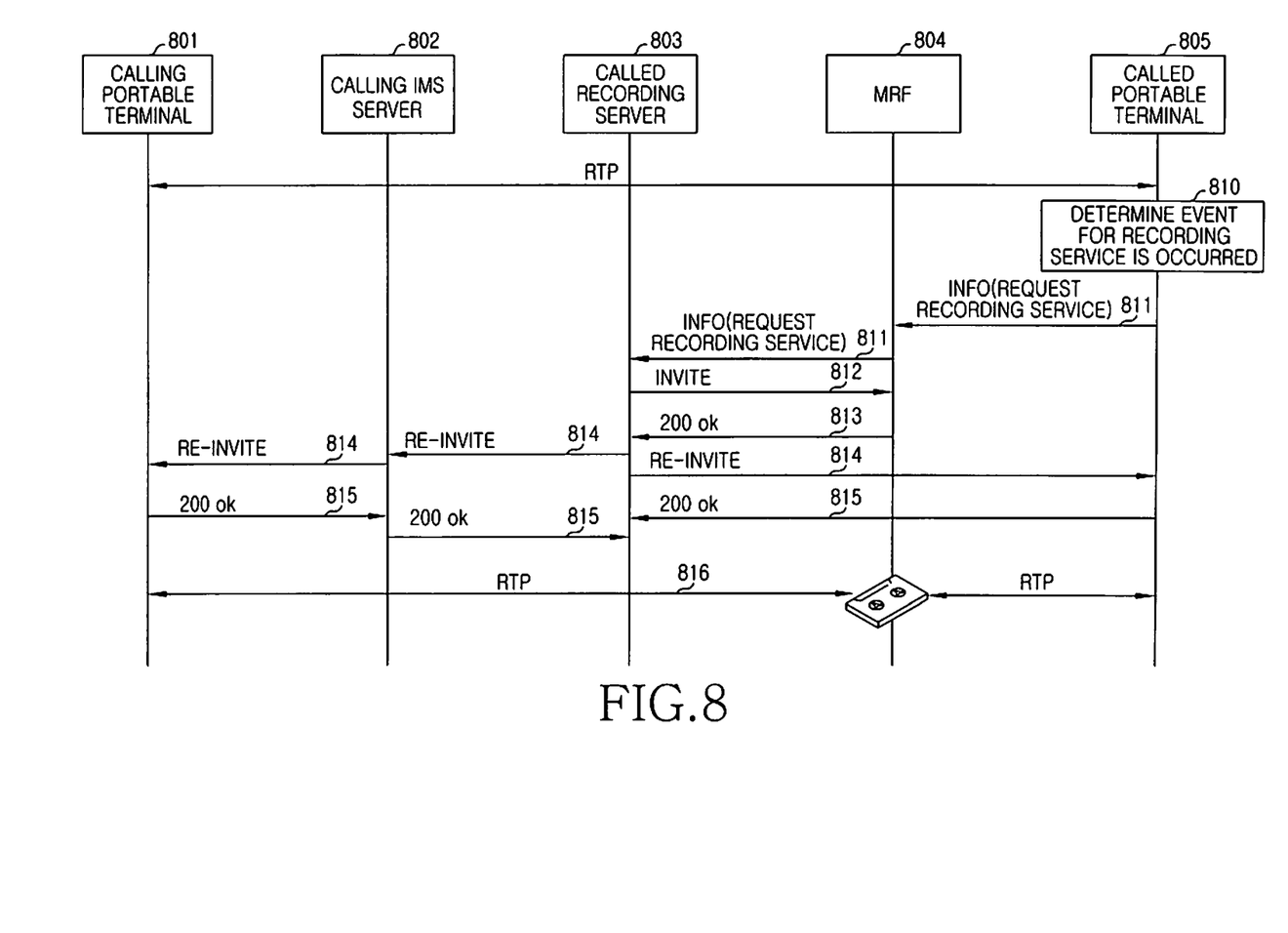
FIG. 8 is a ladder diagram illustrating a recording service method in a called portable terminal according to an embodiment of the present invention.

FIG. 8 is a ladder diagram illustrating a recording service in a called portable terminal according to an embodiment of the present invention. More specifically, FIG. 8 illustrates a recording service being established between a calling portable terminal 801 and a called portable terminal 805, after the portable terminals 801 and 805 have already established a call connection.

In step 810, the called portable terminal 805 determines a recording service is needed, and in step 811, requests the recording service to the called recording server 803 using an "INFO" message included SIP signaling, in step 811.

In step 812, the called recording server 803 transmits the received request to a called recording server including a Media Resource Functional (MRF) module 804. In step 813, the called recording server 803 receives a response including an address of the MRF module 804 as a target address from the MRF module 804.

In step 814, the called recording server 803 transmits the received address of the MRF module 804 to the calling portable terminal 801 and the called portable terminal 805 using a "RE-INVITE" message, and receives a response message "200 OK" from the portable terminals 801 and 805 in step 815. Accordingly, a bearer traffic path between the calling portable terminal 801 and the called portable terminal 805 is set via the MRF module 804, in step 816.

Thereafter, the MRF module 804 records the conversation between the calling portable terminal 801 and the called portable terminal 805.

Figure 9:
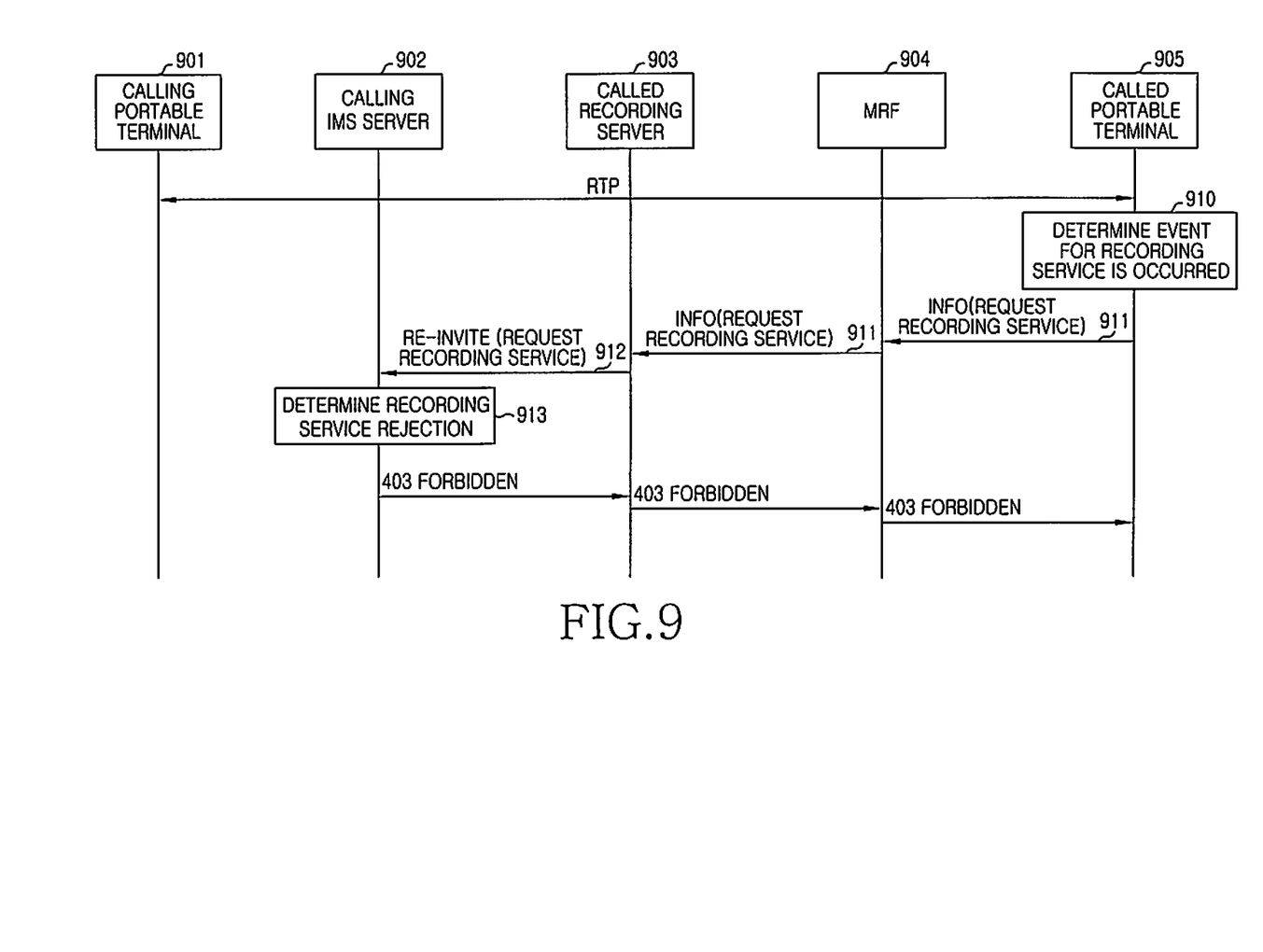
FIG. 9 is a ladder diagram illustrating a recording service rejection method in a called portable terminal according to an embodiment of the present invention.

FIG. 9 is a ladder diagram illustrating a recording service rejection method in a called portable terminal according to an embodiment of the present invention.

Referring to FIG. 9, during a connected call, a called portable terminal 905 determines that a recording service is needed in step 910, and requests a recording service to the called recording server 903 using an "INFO" message included SIP signaling in step 911.

In step 912, the called recording server 903 transmits the received request message "RE-INVITE" to a calling IMS server, and in step 913, the calling IMS server determines whether the calling portable terminal 901 has previously registered a recording service rejection.

The request of the recording service is expressed as shown below, "record" in "supported header" of the SIP message.
INVITE sip:example@home.net SIP/2.0
From: "example 1" <sip:example1@samsung.com>
To:"example 2" <sip:example2@home.net>
Supported: record
CSeq: 7 INVITE
Call-ID: XXXX If the calling IMS server 902 determines that registered recording service rejection exists in step 913, the calling IMS server 902 transmits a response message "403 forbidden" to the called portable terminal 905 to reject the recording service. That is, if the called portable terminal 905 requests the recording service, the request is transmitted to the calling IMS server 902, and the calling IMS server 902 rejects the recording service, if the calling portable terminal 901 does not allow the recording service.

Figure 10:
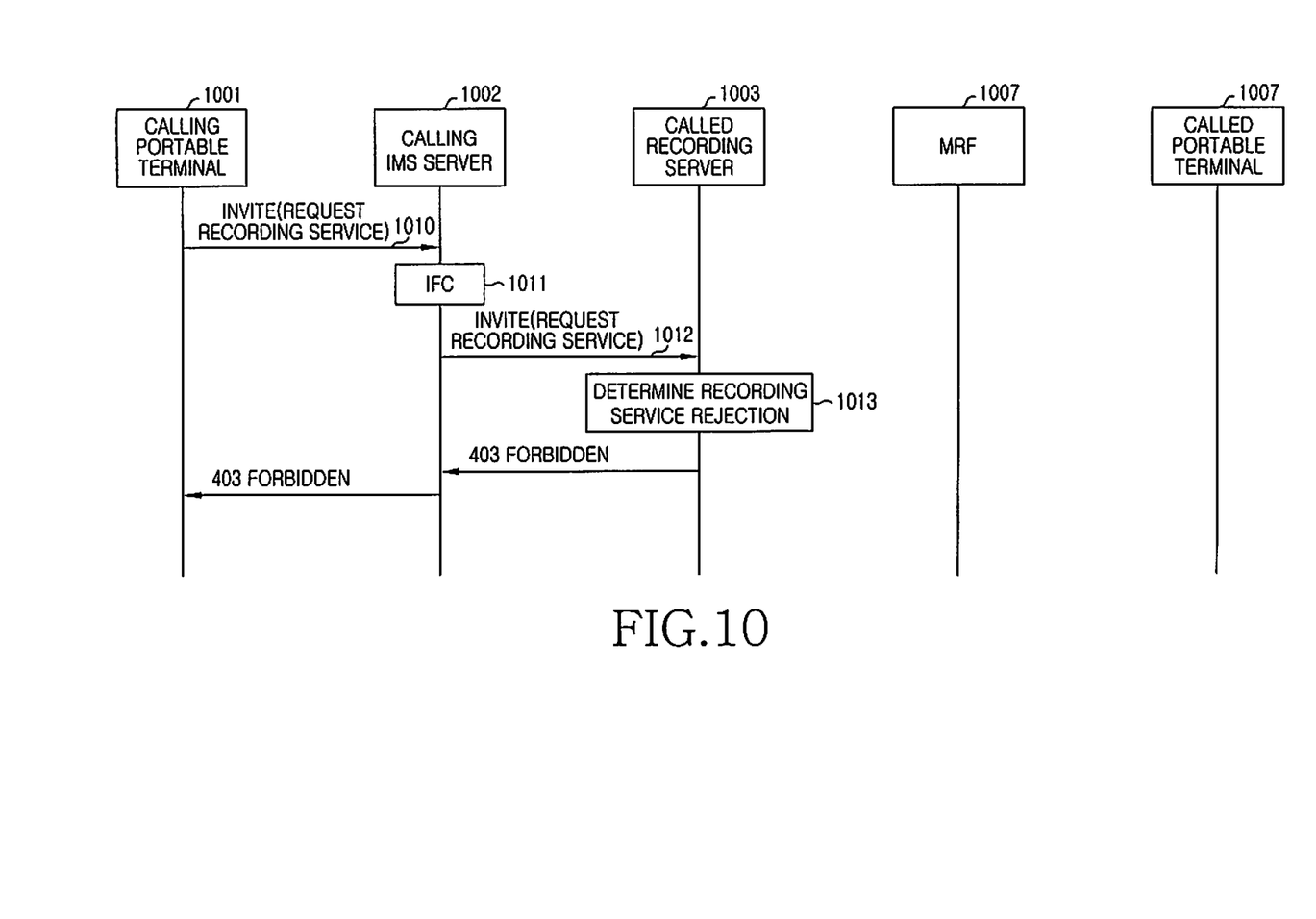
FIG. 10 is a ladder diagram illustrating a recording service rejection method in a calling portable terminal according to an embodiment of the present invention.

FIG. 10 is a ladder diagram illustrating a recording service rejection method in a calling portable terminal according to an embodiment of the present invention.

Referring to FIG. 10, before a call is connected, in step 1010, a calling portable terminal 1001 transmits a call setting message including a recording service request indicator to a calling IMS server 1002. In step 1011, the calling IMS server 1002 sets an Initial Filter Criteria (iFC) related the recording service, and in step 1012, sends the call setting message to a called recording server 1103.

In step 1013, the called recording server 1003 determines whether the called portable terminal 1005 has registered a recording service rejection. If it is determined that there is a registered recording service rejection, the called recording server 1003 transmits a response message "403 Forbidden" to the calling portable terminal 1001 to reject the recording service.

Figure 11:
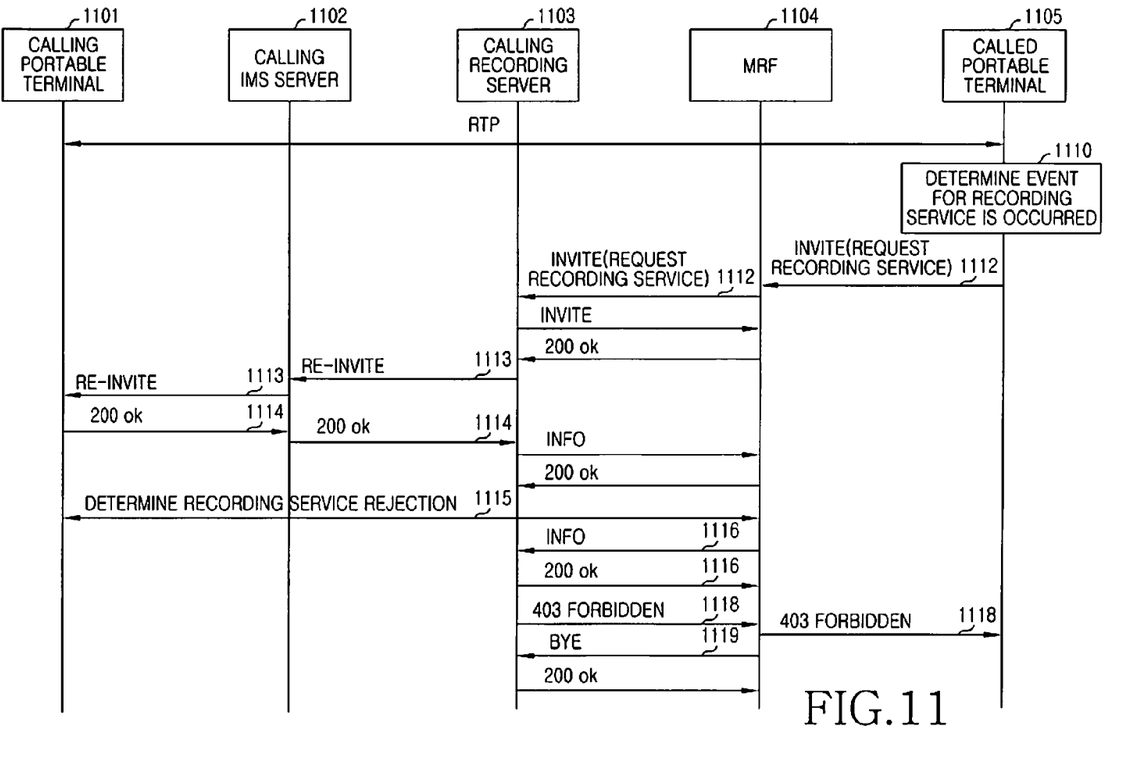
FIG. 11 is a ladder diagram illustrating a recording service rejection method in a calling portable terminal according to an embodiment of the present invention.

FIG. 11 is a ladder diagram illustrating a recording service rejection method in a calling portable terminal according to an embodiment of the present invention.

Referring to FIG. 11, during a call, in step 1110, a called portable terminal 1105 determines that a recording service is needed, and in step 1112, the called portable terminal 1105 requests the recording service to the calling recording server 1103. The calling recording server 1103 requests a recording service to the MRF using an "INVITE" message, and receives a response message "200 OK" from the MRF.

In step 1113, the calling recording server 1103 transmits the received request to the calling portable terminal 1101 and in step 1114, receives a response from the calling portable terminal 1101. And the calling recording server 1103 transmits the received responds to the MRF using an "INFO" message, and receives a response message "200 OK" from the MRF.

In step 1115, the calling portable terminal 1101 displays an indication that the called portable terminal 1105 would like to record the conversation and requests if a user of the calling portable terminal 1101 will allow the recording. If the user of the calling portable terminal 1101 will allow the recording, the calling portable terminal 1101 performs the recording service. However, if the user of the calling portable terminal 1101 will not allow the recording, the calling portable terminal 1101 transmits a message indicating that the recording service is rejected to the MRF Module 1104, which acts as the calling recording server.

In step 1116, the Media Resource Functional (MRF) 1104 transmits the received message to the calling recording server 1103 and receives a respond from the calling recording server 1103.

In step 1118, the calling recording server 1103 transmits "403 forbidden" response to the called portable terminal and in step 1119, the MRF transmits "BYE" response to the calling recording server to make not the recording service.

Figure 12:
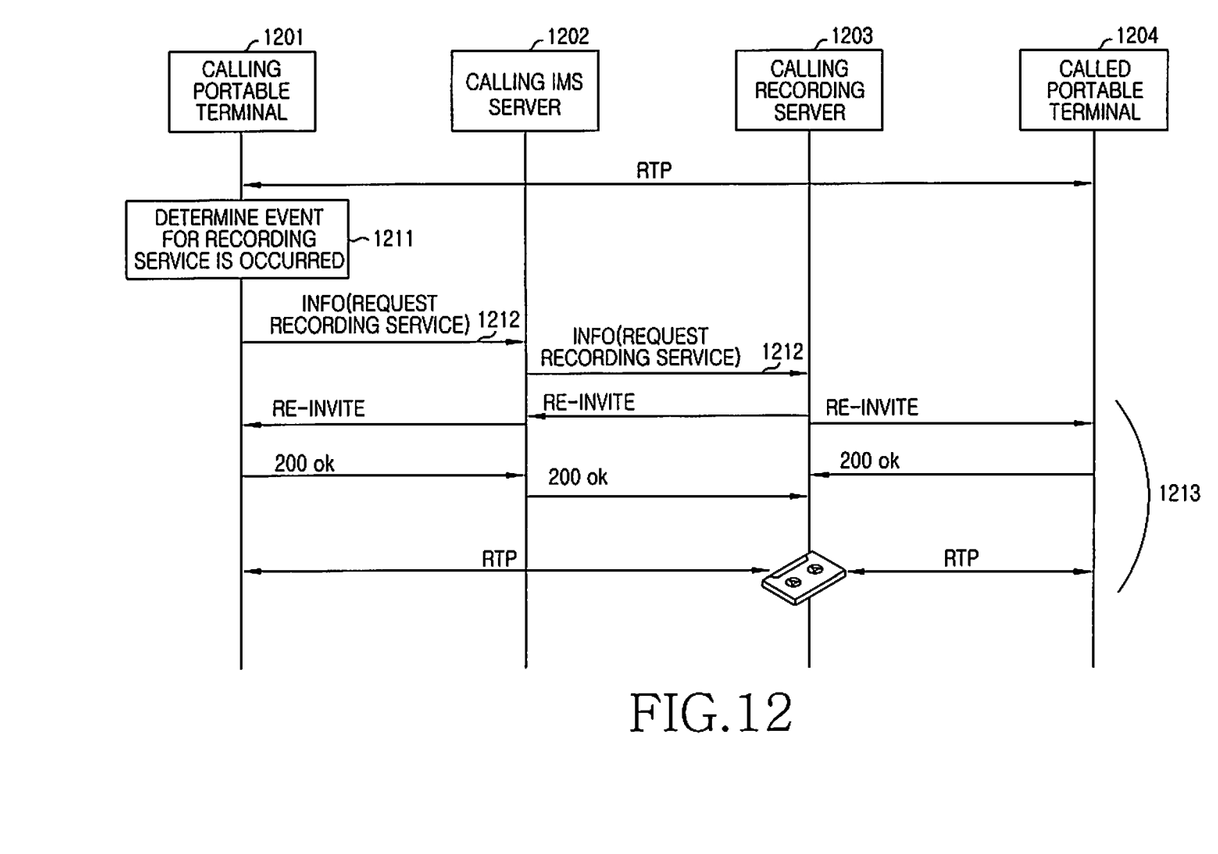
FIG. 12 is a ladder diagram illustrating a recording service method in a calling portable terminal according to an embodiment of the present invention.

FIG. 12 is a ladder diagram illustrating a recording service method in a calling portable terminal according to an embodiment of the present invention.

More specifically, FIG. 12 illustrates a recording service method in a mobile communication system that does not include a Media Resource Functional (MRF) module.

Referring to FIG. 12, during a call, in step 1210, a calling portable terminal 1201 determines that a recording service is needed, and in step 1211 requests the recording service to the calling recording server 1203 via a calling IMS server 1202. In step 1212, the calling recording server 1203 transmits its own address as a target address to the calling portable terminal 1201 and the called portable terminal 1204 using a RE-INVITE message. Accordingly, a bearer traffic path between the calling portable terminal 1201 and the called portable terminal 1204 is set via the calling recording server 1203.

Thereafter, in step 1213, the calling recording server 1203 records the conversation between the calling portable terminal 1201 and the called portable terminal 1204.

As described above, in accordance with the embodiments of the present invention, a path of bearer traffic is set for recording a conversation between a calling portable terminal and a called portable terminal, when there is a recording request from at least one of the calling portable terminal and the called portable terminal, which is not rejected by any of the terminals. Therefore, the problem in which the prior art regarding a recording service not being provided in an IMS network based on Voice over Internet Protocol (VoIP) is solved.

In addition, the embodiments of present invention have advantages in that a recording service is can be initiated by either a calling or called terminal at the start of a call connection or after the call is already connected.

While the present invention has been shown and described with reference to certain embodiments thereof, it will be understood by those skilled in the art that various changes in form and details may be made therein without departing from the spirit and scope of the present invention as defined by the appended claims and their equivalents. Therefore, the scope of the present invention is defined not by the detailed description of the invention but by the appended claims and their equivalents, and all differences within the scope will be construed as being included in the present invention.

What is claimed is:

1. A recording server for providing a recording service in an Internet Protocol (IP) Multimedia Subsystem (IMS) network based on Voice over IP (VoIP) communication, the apparatus comprising:
    a communication unit configured to receive a recording request from one of a calling portable terminal and a called portable terminal;
    a recording service manager unit coupled to the communication unit and configured to set a path of bearer traffic to itself for recording a conversation between the calling portable terminal and the called portable terminal, in response to the recording request; and
    a controller configured to control the communication unit to transmit the received recording request to the recording service manager unit and to control the recording service manager unit to perform at least one of the calling portable terminal's voice call recording service and the called portable terminal's voice call recording service,
    wherein the path of bearer traffic performs at least one of the calling portable terminal's voice call recording service and the called portable terminal's voice call recording service through the recording server, in response to the recording request, and
    wherein setting the path of bearer traffic to the recording server for recording the conversation between the calling portable terminal and the called portable terminal comprises transmitting to the calling portable terminal and the called portable terminal an address of the recording server for recording the conversation between the calling portable terminal and the called portable terminal.

2. The apparatus of claim 1, wherein the controller is further configured to control the recording service manager unit to set the path of the bearer traffic by modifying a Session Initiation Protocol (SIP) message.

3. The apparatus of claim 1, wherein the controller is further configured to control the recording service manager unit to set the path of the bearer traffic at an execution of a call connection between the calling portable terminal and the called portable terminal.

4. The apparatus of claim 1, wherein the controller is further configured to control the recording service manager unit to set the path of the bearer traffic, after a call connection has been established between the calling portable terminal and the called portable terminal.

5. The apparatus of claim 1, wherein the controller is further configured to control the recording service manager unit to reject the recording request, if there is a rejection from one of the calling portable terminal and the called portable terminal.

6. The apparatus of claim 1, wherein the controller is further configured to control the recording service manager unit to reject the recording request, if there is a pre-registered rejection message stored in a recording server from one of the calling portable terminal and the called portable terminal.

7. A method of providing a recording service in an Internet Protocol (IP) Multimedia Subsystem (IMS) network based on Voice over IP (VoIP) communication, the method comprising:
    receiving, by a recording server, a recording service request from one of a calling portable terminal and a called portable terminal; and
    setting, by the recording server, a path of bearer traffic to a recording server itself for recording a conversation between the calling portable terminal and the called portable terminal, in response to the recording request, wherein the path of bearer traffic performs at least one of the calling portable terminal's voice call recording service and the called portable terminal's voice call recording service through the recording server itself, in response to the recording request, and wherein setting the path of bearer traffic to the recording server for recording the conversation between the calling portable terminal and the called portable terminal comprises transmitting to the calling portable terminal and the called portable terminal an address of the recording server for recording the conversation between the calling portable terminal and the called portable terminal.

8. The method of claim 7, wherein setting the path of the bearer traffic comprises modifying a Session Initiation Protocol (SIP) message.

9. The method of claim 7, wherein setting the path of the bearer traffic is performed at an execution of a call connection between the calling portable terminal and the called portable terminal.

10. The method of claim 7, wherein setting the path of the bearer traffic for the call is performed after a call connection has been established between the calling portable terminal and the called portable terminal.

11. The method of claim 7, further comprising rejecting the recording service request, if there is a rejection from one of the calling portable terminal and the called portable terminal.

12. The method of claim 7, further comprising rejecting the recording service request, if there is a pre-registered rejection message in the recording server from one of the calling portable terminal and the called portable terminal.

13. An Internet Protocol (IP) Multimedia Subsystem (IMS) network based on Voice over IP (VoIP) communication for providing a recording service, the system comprising:
   a calling portable terminal;
   a called portable terminal; and
   a recording server for receiving a recording service request from one of the calling portable terminal and the called portable terminal, and for setting a path of bearer traffic to a recording server itself for recording a conversation between the calling portable terminal and the called portable terminal, in response to the recording request,
   wherein the path of bearer traffic performs at least one of the calling portable terminal's voice call recording service and the called portable terminal's voice call recording service through the recording server itself, in response to the recording request, and
   wherein setting the path of bearer traffic to the recording server for recording the conversation between the calling portable terminal and the called portable terminal comprises transmitting to the calling portable terminal and the called portable terminal an address of the recording server for recording the conversation between the calling portable terminal and the called portable terminal.

14. The IP Multimedia Subsystem of claim 13, wherein the recording server sets the path of the bearer traffic by modifying a Session Initiation Protocol (SIP) message.

15. The IP Multimedia Subsystem of claim 13, wherein the recording server sets the path of the bearer traffic at an execution of a call connection between the calling portable terminal and the called portable terminal.

16. The IP Multimedia Subsystem of claim 13, wherein the recording server sets the path of the bearer traffic after a call connection has been established between the calling portable terminal and the called portable terminal.

17. The IP Multimedia Subsystem of claim 13, wherein the recording service request is rejected, if there is a rejection from one of the calling portable terminal and the called portable terminal.

18. The IP Multimedia Subsystem of claim 13, wherein the recording service request is rejected if there is a pre-registered rejection message stored in the recording server from one of the calling portable terminal and the called portable terminal.

19. A portable terminal for providing a recording service using an Internet Protocol (IP) Multimedia Subsystem (IMS) network based on Voice over IP (VoIP) communication, the portable terminal comprising:
   a communication unit for transmitting a recording service request to a recording server and receiving an address of the recording server from the recording server; and
   a recording service manager unit coupled to the communication unit for setting a path of bearer traffic to the recording server based on the received address for recording a conversation between the portable terminal and another portable terminal,
   wherein the path of bearer traffic performs at least one of the calling portable terminal's voice call recording service and the called portable terminal's voice call recording service through the recording server itself, in response to the recording request.

20. The portable terminal of claim 19, wherein the recording service request is transmitted using a Session Initiation Protocol (SIP) message.

21. The portable terminal of claim 19, wherein the recording service request is transmitted after a call connection has been established between the portable terminal and the another portable terminal.

22. The portable terminal of claim 19, wherein the portable terminal transmits a rejection request for the recording to the server after the recording service request has been transmitted.

23. A method of providing a recording service in a portable terminal using an Internet Protocol (IP) Multimedia Subsystem (IMS) network based on Voice over IP (VoIP) communication, the method comprising:
   transmitting, by the portable terminal, a recording service request to a recording server;
   receiving an address of the recording server from the recording server; and
   setting a path of bearer traffic to the recording server based on the received address for recording a conversation between the portable terminal and another portable terminal,
   wherein the path of bearer traffic performs at least one of the calling portable terminal's voice call recording service and the called portable terminal's voice call recording service through the recording server itself, in response to the recording request.

24. The method of claim 23, wherein the recording service request is transmitted using a Session Initiation Protocol (SIP) message.

25. The method of claim 23, wherein the recording service request is transmitted after a call connection has been established between the portable terminal and the another portable terminal.

26. The method of claim 23, further comprising transmitting a rejection request for the recording to the server after the recording service request has been transmitted.

* * * * *